US012552185B2

(12) United States Patent
Navas Sanchez et al.

(10) Patent No.: US 12,552,185 B2
(45) Date of Patent: Feb. 17, 2026

(54) PRINT ADJUSTMENTS BASED ON AIR MEASUREMENTS

(71) Applicant: Hewlett-Packard Development Company, L.P., Spring, TX (US)

(72) Inventors: Borja Navas Sanchez, Sant Cugat del Valles (ES); Ramon Viedma Ponce, Sant Cugat del Valles (ES); Joan Farre Bravo, Sant Cugat del Valles (ES); William James Allen, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 136 days.

(21) Appl. No.: 18/007,198

(22) PCT Filed: Jul. 30, 2020

(86) PCT No.: PCT/US2020/044320
§ 371 (c)(1),
(2) Date: Jan. 27, 2023

(87) PCT Pub. No.: WO2022/025902
PCT Pub. Date: Feb. 3, 2022

(65) Prior Publication Data
US 2023/0234383 A1 Jul. 27, 2023

(51) Int. Cl.
*B41J 2/14* (2006.01)
*B41J 2/045* (2006.01)
*B41J 2/145* (2006.01)
*B41J 25/308* (2006.01)
*B41J 29/02* (2006.01)

(52) U.S. Cl.
CPC ......... *B41J 25/308* (2013.01); *B41J 2/04573* (2013.01); *B41J 2/1433* (2013.01); *B41J 2/145* (2013.01); *B41J 29/02* (2013.01)

(58) Field of Classification Search
CPC .... B41J 25/308; B41J 2/04573; B41J 2/1433; B41J 2/145; B41J 29/02
See application file for complete search history.

(56) References Cited

U.S. PATENT DOCUMENTS

| | | | | |
|---|---|---|---|---|
| 4,321,607 | A | 3/1982 | Heibein et al. | |
| 5,719,602 | A | 2/1998 | Hackleman et al. | |
| 6,739,705 | B2 | 5/2004 | Jeanmaire et al. | |
| 6,767,088 | B2 | 7/2004 | Sarmast | |
| 8,075,120 | B2 | 12/2011 | Ide et al. | |
| 8,690,292 | B1 * | 4/2014 | Rimai | B41J 2/155<br>347/29 |

(Continued)

FOREIGN PATENT DOCUMENTS

| | | | |
|---|---|---|---|
| CN | 109823050 A | | 5/2019 |
| JP | 2004-345326 A | | 12/2004 |
| WO | 2004/069546 A1 | | 8/2004 |

*Primary Examiner* — Jason S Uhlenhake
(74) *Attorney, Agent, or Firm* — Jordan IP Law, LLC

(57) ABSTRACT

An example method is described in which a property is measured associated with air flowing through a print gap between a print head and a printing substrate, the print head to eject a print fluid on the printing substrate; an ejection of print fluid is adjusted from the print head based on the measured property.

15 Claims, 6 Drawing Sheets

(56) References Cited

U.S. PATENT DOCUMENTS

| | | | | |
|---|---|---|---|---|
| 2004/0223025 | A1 * | 11/2004 | D'souza | B03B 9/063 347/19 |
| 2006/0279590 | A1 * | 12/2006 | Buehler | B41J 2/17593 347/9 |
| 2010/0110129 | A1 | 5/2010 | Silverbrook | |
| 2014/0085371 | A1 * | 3/2014 | Ebisawa | B41J 2/04501 347/14 |
| 2016/0101622 | A1 | 4/2016 | Sakata et al. | |
| 2016/0243827 | A1 * | 8/2016 | Hawkins | B41J 2/1433 |
| 2017/0080731 | A1 * | 3/2017 | Miller | A43B 3/0078 |
| 2019/0105897 | A1 | 4/2019 | Slotto et al. | |

* cited by examiner

PRINT ADJUSTMENTS BASED ON AIR MEASUREMENTS

BACKGROUND

A printing system may include a pen or a print head to apply a print fluid on a printing substrate so as to print a plot or an image. The quality of the printed image depends on a number of factors, including the accuracy in the positioning of the print fluid on the printing substrate. This accuracy in turn may depend inter alia on atmospheric conditions.

BRIEF DESCRIPTION

Figure 1:
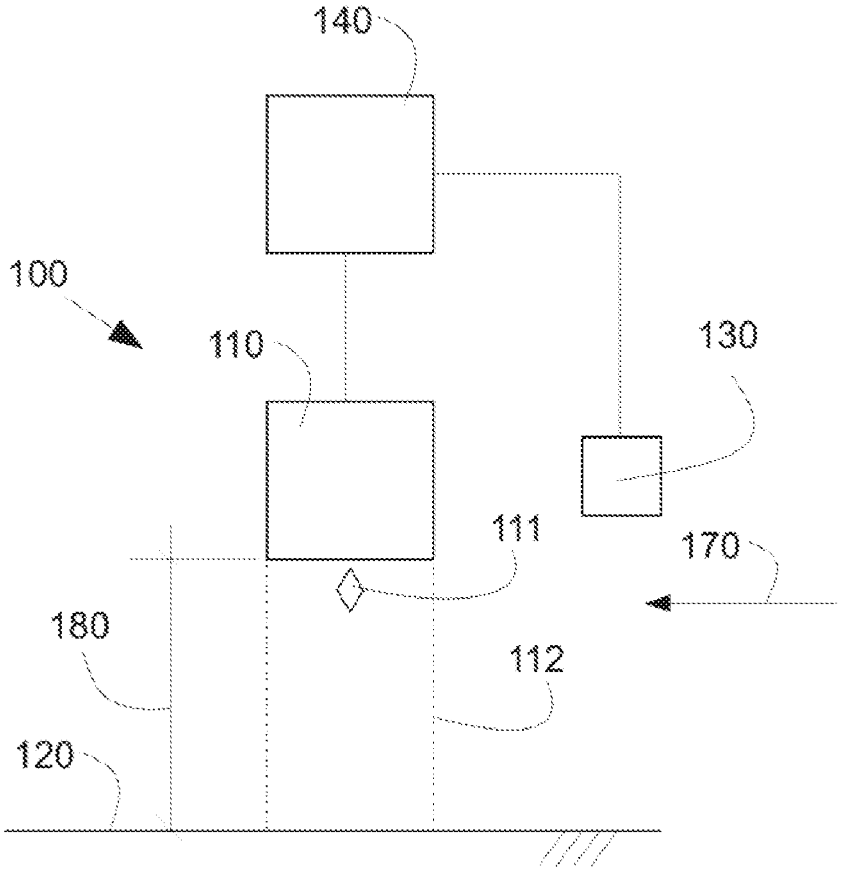

Various example features will be apparent from the detailed description which follows, taken in conjunction with the accompanying drawings, wherein:

FIG. 1 schematically represents a printing system according to an example of the present disclosure.

Figure 2:
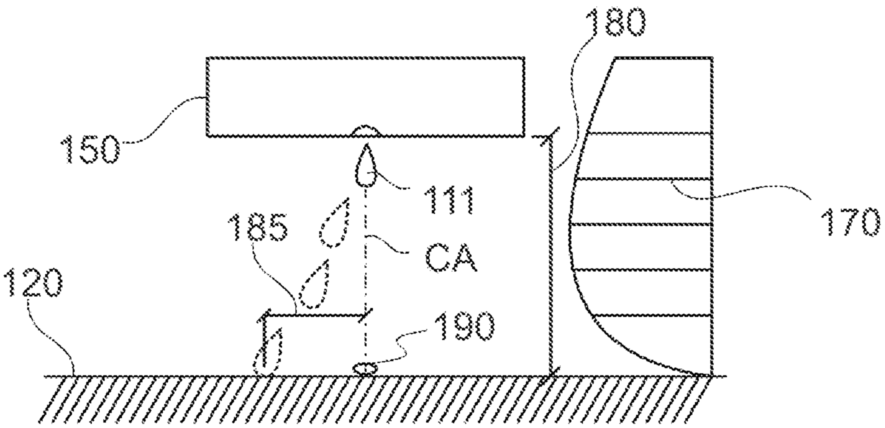

FIG. 2 schematically represents a print head and a drop of print agent ejected by a print head onto a printing substrate with a drop landing error.

Figure 3:
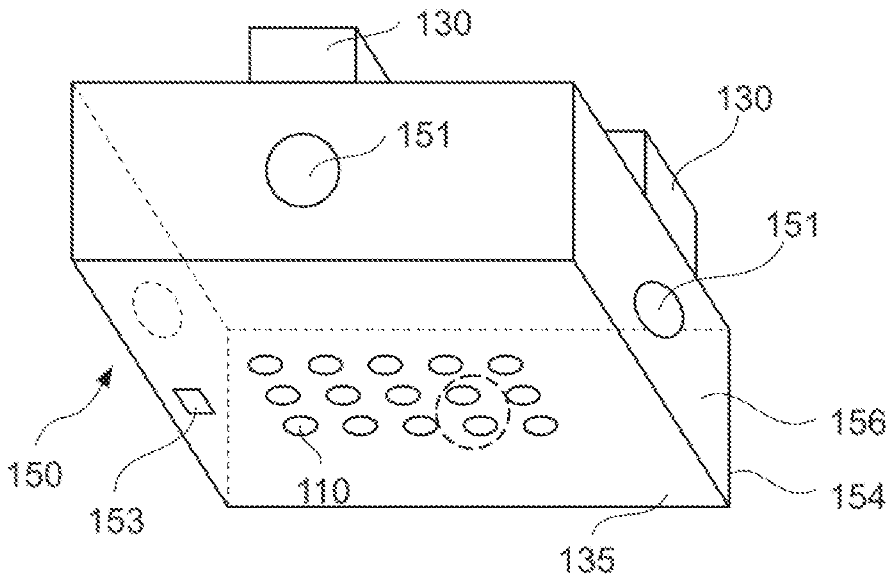

FIG. 3 schematically represents a perspective view of a print head of a printing system according to an example of the present disclosure.

Figure 4:
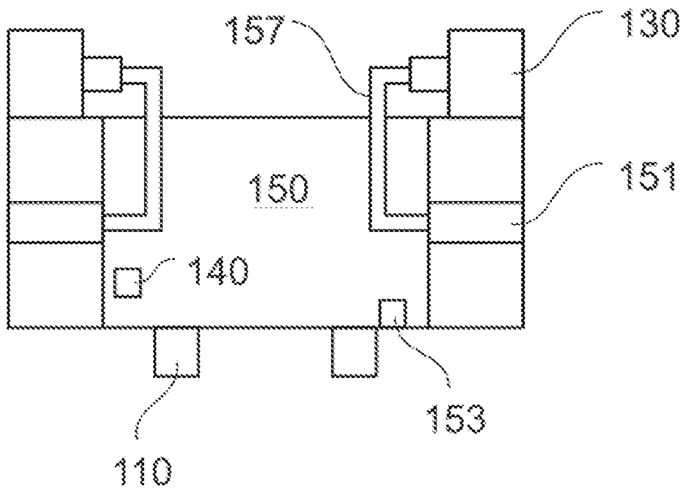

FIG. 4 schematically illustrates a cross section view of the print head of FIG. 3.

Figure 5:
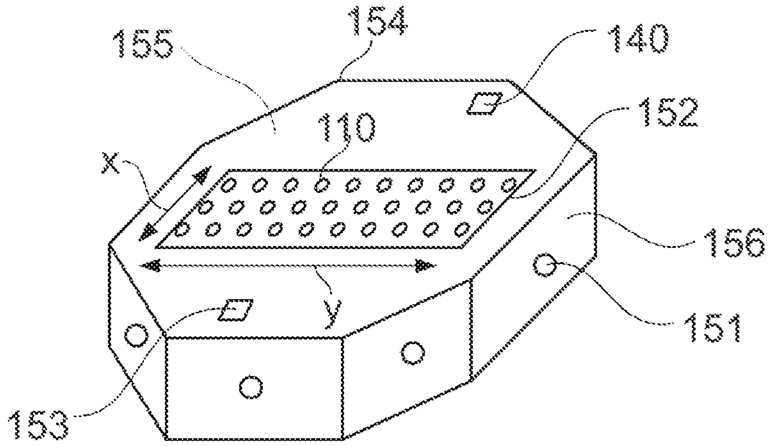

FIG. 5 schematically represents a perspective view of a print head of a printing system according to an example of the present disclosure.

Figure 6:
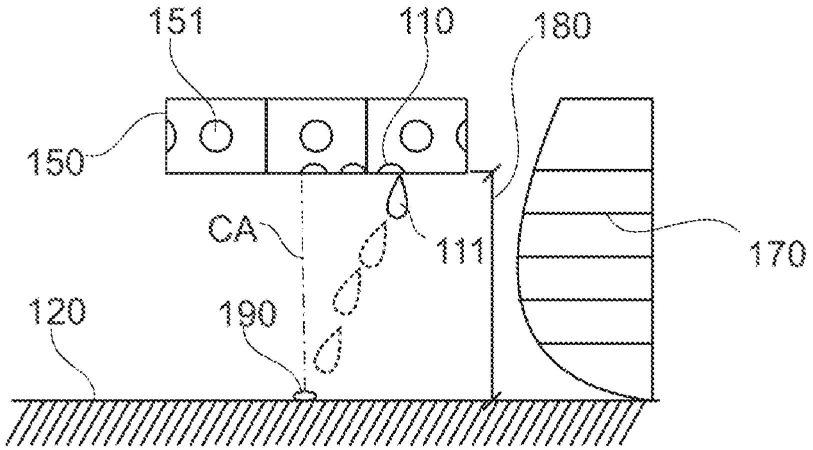

FIG. 6 schematically represents a print head and a drop of a print agent ejected by the print head of a printing system according to an example of the present disclosure.

Figure 7:
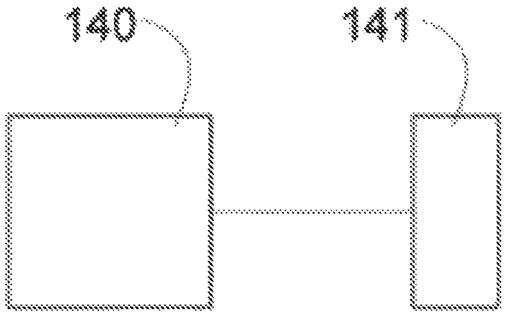

FIG. 7 schematically illustrates a non-transitory machine-readable storage medium with a processor of the FIG. 1.

Figure 8:
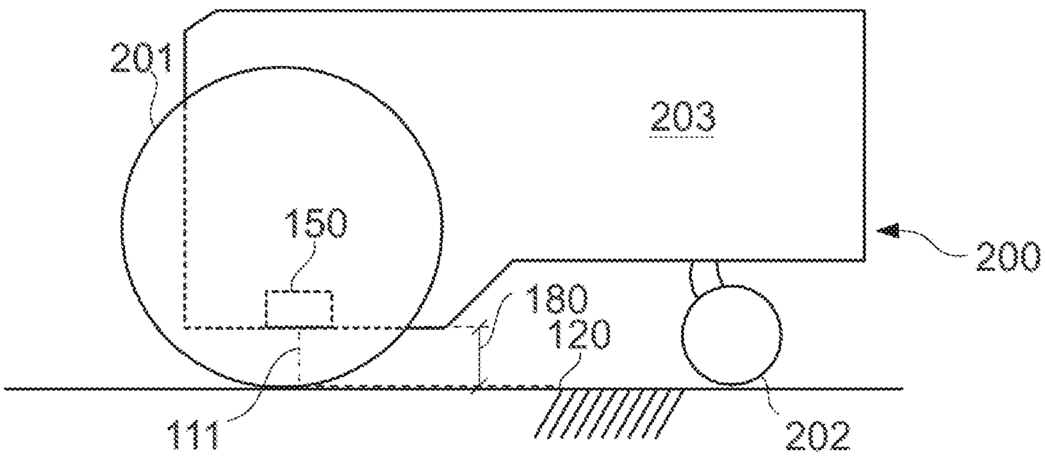

FIG. 8 schematically represents a vehicle according to an example of the present disclosure.

Figure 9:
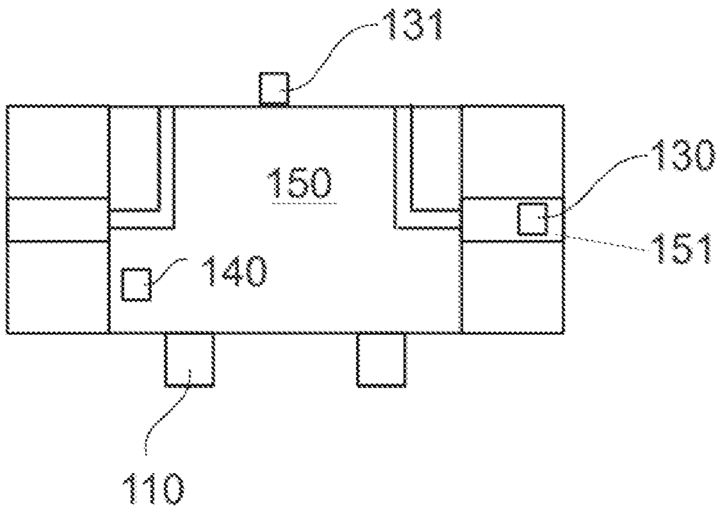

FIG. 9 schematically represents a printing system and a reference sensor according to an example of the present disclosure.

Figure 10:
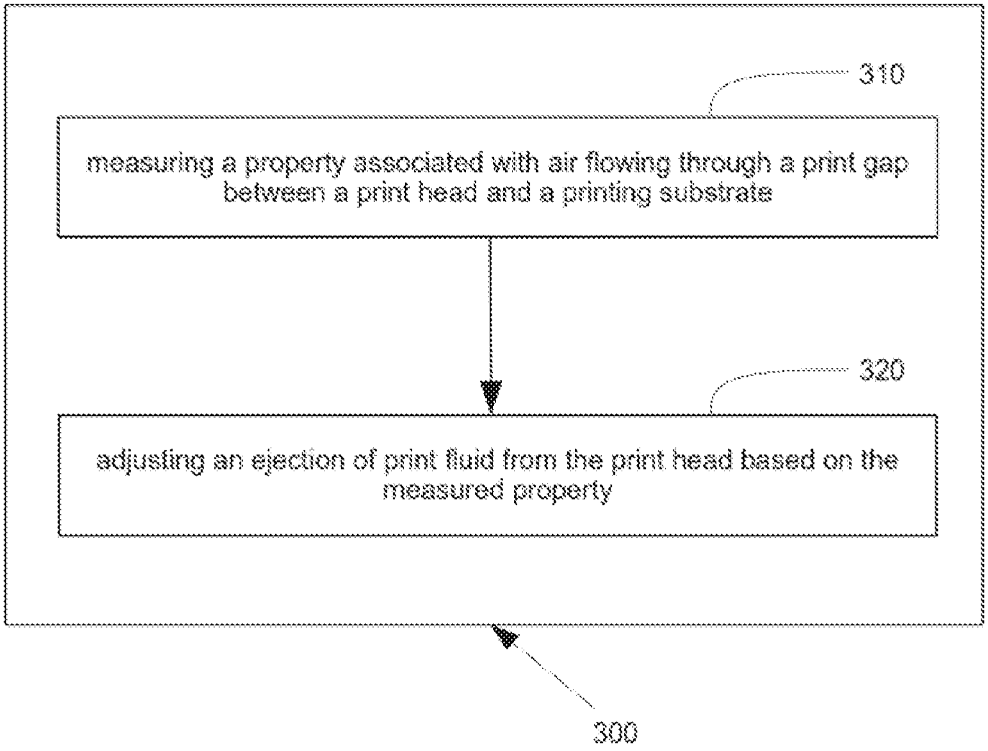

FIG. 10 is a block diagram of an example of a method of the present disclosure.

DETAILED DESCRIPTION

FIG. 1 schematically represents a printing system according to an example of the present disclosure. The printing system 100 comprises: a nozzle 110 to eject a drop of print agent 111 through a print gap 112 between the nozzle 110 and a printing substrate 120, a sensor 130 indicative of an air flow in the print gap 112 and a processor 140 to adjust a firing of the nozzle 110 based on a reading of the sensor.

In some examples, the sensor 130 may be a sensor to detect the air flow. In examples, the sensor 130 may be a sensor to detect a parameter or property of the air flow or associated with the air flow.

In some examples, the sensor 130 may be a pressure sensor, a thermistor or a flow sensor. In examples, the printing system 100 may comprise one of the herein disclosed sensor types or may comprise several sensor types. In examples, the thermistor may be a Negative Temperature Coefficient (NTC) thermistor.

The thermistor may be a type of resistor sensitive to temperature, i.e. the resistance of the thermistor may be dependent on its temperature. The thermistor may undergo a variation in resistance if the flow rate and/or flow speed of the air flow in the print gap 112 increases or decreases, due to the thermistor absorbing more or less heat by convection from the air flow or dissipating more or less heat by convection into the air flow. In the example of NTC thermistors, the resistance of the thermistor may increase as the temperature of the thermistor decreases, e.g. due to a change in the environment around the thermistor, e.g. a change in the air flow rate or air flow speed.

In an example, the thermistor may be exposed, at least partially, to a fluid flow, e.g. the air flow in the print gap 112. Energy, e.g. heat, may be transferred from the thermistor to the fluid flow by convection or convective heat transfer. The temperature of the thermistor may therefore vary, and the resistance of the thermistor may change. In the example of NTC thermistor, the temperature of thermistor may decrease, and the resistance of the thermistor may increase.

In some examples, the reading of the sensor may be a dynamic pressure, a resistance, or a flow rate. In examples, the reading of the sensor may be a combination of at least two of the herein disclosed readings.

In some examples, the property or parameter may be a dynamic pressure of air flow, for example the air flow in the print gap or an air flow representative of the air flow in the print gap or related to the air flow in the print gap. In examples, the property or parameter may be a resistance of a thermistor, e.g. electrical resistance. In some examples, the property o parameter may be a flow rate of the air flow.

In examples, the sensor 130 may be a pressure sensor to sense a dynamic pressure associated with air flowing in the print gap 112, and the processor 140 may be to adjust a firing of the nozzle or nozzles 110 based on the sensed or measured dynamic pressure.

In some examples, the nozzle 110 may be provided in a print head 150. Thus, the print gap 112 may be defined between the print head 150, and so the nozzle 110, and the printing substrate 120. A height of the print gap 112 may be a clearance 180 between the print head 150 and the printing substrate 120.

In examples, the processor 140 of the printing system 100 may be to control the operation of the nozzle or nozzles 110 based on the reading of the sensor or measured property/parameter associated with the air flow.

In FIG. 1 flowing air has been represented with arrow 170.

FIG. 2 schematically represents a print head and a drop of print agent ejected by a print head onto a printing substrate with a drop landing error. A flowing air 170 may displace an amount of ejected print agent 111 in the print gap and may cause the print agent 111 to be delivered onto the printing surface in a wrong position, i.e. a drop error. In FIG. 2 a displacement 185 represents the drop error. Depending on the environment where the nozzle is located, i.e. indoor or outdoor, the influence of the air flowing in the print gap 112 may vary. In some examples, the influence of air flowing outdoor may be higher than indoor.

In FIG. 2 different positions of a drop of print agent 111 have been illustrated along a trajectory path from the print head 150 to the printing substrate 120.

A higher speed of air flow may mean a higher Reynolds Number (Re) and also a higher energy of the air flow. Thus, the Reynolds Number (Re) of the flowing air may be related to the speed or magnitude thereof. Furthermore, the printing substrate 120 may be exposed to flowing air with random Reynolds Number (Re), both indoor and outdoor. The printing substrate 120 may be exposed to flowing air with random direction with respect to the print head 150 and so the nozzle 110.

As a clearance 180 between printing substrate 120 and print head 150 increases, speed of air in the clearance, i.e.

local speed of air, may be reduced. Although the speed of air may be reduced, the drop of print agent 111 may travel for a higher distance from the print head 150 to the printing substrate 120 and therefore the landing error may be higher.

Thus, a greater height or clearance may mean a greater error of the drop landing, e.g. a greater error displacement 185 with respect to the target 190 on the printing substrate 120. In some examples, a clearance or height of approximately 20 mm may lead to a significant drop error which may consequently lead to large errors on the rendered job. In some examples, the clearance or height may be shorter than 20 mm. In some examples, the clearance or height may be larger than 20 mm.

Reducing clearance 180 may otherwise increase speed of air in the clearance which may mean more momentum transferred from the air into the drop of print agent 111 and therefore higher error too.

FIGS. 2 and 6 show arrows 170 representing the distribution of the magnitude vectors of the flowing air from the printing substrate 120. It can be seen that as the height or clearance increases, the force of the air may be greater and so the error of the drop landing. A greater height or clearance may amplify the error of the drop landing. By way of example, the mentioned clearance of 20 mm may imply a deviation of 6 or 7 mm from the target on the printing substrate 120 with a wind flowing at 50 km/h.

FIG. 6 schematically represents a print head and a drop of a print agent ejected by the print head of a printing system according to an example of the present disclosure. In FIG. 6 different positions of a drop of print agent 111 have been illustrated along a trajectory path from the print head 150 to the printing substrate 120. A landing of the drop in the target 190 on the printing substrate 120 may be obtained.

By sensing or measuring the property or parameter, the ejection of print agent 111 may be adjusted to compensate for the air flowing in the print gap 112. An ejected amount of print agent 111 may reach a predefined target in the printing substrate 120 in spite of the air flowing through the print gap 112. Thus, relatively high-resolution dots of print agent may be rendered over any printing substrates 120. Accuracy may be enhanced at any ambient conditions and so productivity may be increased. As the printing system 100 may compensate for the flowing air, an aerodynamically-compensated drop control may be obtained.

By virtue of the printing system 100 of FIG. 1 aerodynamic-induced errors on drop landing may be minimized.

In examples, the printing system 100 may apply a compensation depending on the speed of flowing air. If the speed varies, the compensation may vary as well. The processor 140 may continuously adjust the firing of the nozzle 110 based on sensed data received from the sensor 130. A variation on the property may be real-time controlled and the firing of nozzle 110 may be changed accordingly. Therefore, the printing system 100 may adapt the compensation for variable ambient conditions.

In some examples, the printing system 100 may not apply a compensation depending on the speed of flowing air. The processor 140 may continuously adjust the firing of the nozzle 110 based on sensed data received from the sensor 130. A variation on the property may be real-time controlled and the firing of nozzle 110 may be maintained accordingly.

In some examples, the property may be related to a mass of air in motion with respect to the nozzle 110 or the print head 150. In some examples, the property may be related to a mass of air in motion with respect to the ejected print agent or print fluid 111. The air may be, for instance a current of air, an air flow, an airstream or a cross wind. A cross wind may be any wind or current that has a perpendicular component to the trajectory path of a drop of print agent. The current of air may be generated, inter alia, by the motion of the print head 150 and so the nozzle 110, by cooling arrangements of the printing system or the room where the nozzle may be located, by opening a window or door of the room where the nozzle may be located or may be wind, i.e. atmospherically generated.

In the example of thermistor, the thermistor may be fed with power to purposely be self-heated substantially above a predefined temperature, e.g. an ambient temperature. The temperature of the self-heated thermistor may depend on how much power may be dissipated into a surrounding medium. As the velocity of air flow increases, an amount of dissipated heat from the thermistor may increase as well. A decrease in temperature of thermistor may mean a variation in resistance of the thermistor. In the example of an NTC thermistor, a decrease in temperature of thermistor may result in a higher resistance of the thermistor. A change in resistance or a resistance may be sensed, measured or detected and may be correlated to a speed or velocity of flowing air. The printing system 100 may apply a compensation depending on the speed of flowing air that may be determined based on the sensed resistance of the thermistor.

In some examples, a heat transfer coefficient between the thermistor as the sensor 130 and an air flow contacting the sensor 130 may be determined or computed based on the sensed resistance. The heat transfer coefficient may be correlated to a speed or velocity of flowing air.

The printing substrate 120 may be any surface(s) to receive the print fluid 111 from the print head. The printing substrate 120 may be, for instance, a print medium, a floor, a roof or a ground. The print medium is a material capable of receiving print agent or print fluid 111, e.g. ink. The print medium may comprise paper, cardboard, cardstock, textile material or plastic material. The print medium may be a sheet, e.g. a sheet of paper or a sheet of cardboard.

In this disclosure, the print agent or print fluid 111 may be delivered on the printing substrate 120, e.g. by firing, ejecting, spitting or otherwise depositing the print agent 111 onto the printing substrate 120.

In some examples, a heating element may cause a rapid vaporization of print agent in a print agent chamber, increasing an internal pressure inside this print agent chamber. This increase in pressure makes a drop of print agent exit from the print agent chamber to the printing substrate through the nozzle 110. These printing systems may be referred to as thermal inkjet printing systems.

In some examples, a piezoelectric may be used to force a drop of print agent to be delivered from a print agent chamber onto the printing substrate through a nozzle. A voltage may be applied to the piezoelectric, which may change its shape. This change of shape may force a drop of print agent to exit through the nozzle 110. These printing systems may be referred to as piezo electric printing systems.

In some examples, an arrangement of coil-driven valves may be used to force a drop of print agent to be delivered from a print agent chamber onto the printing substrate through a nozzle. A voltage may be applied to the coil which may induce a displacement on a rod which then may allow the print agent to be extruded from a nozzle plate for a duration of time while the rod is lifted. When the electrical signal stops, the coil may stop providing lifting force to the rod and a delivery of print agent from the print agent chamber may be interrupted. Hence extrusion of print agent from the nozzle 110 may be stopped. These printing systems might be referred to as valvejet printing systems.

For purposes of this application, the controller or processor 140 may be a presently developed or future developed processor or processing resources that executes sequences of machine-readable instructions contained in a memory.

In some examples, the memory may be a non-transitory machine-readable storage medium 141. The non-transitory machine-readable storage medium 141 is coupled to the processor 140. FIG. 7 schematically illustrates a non-transitory machine-readable storage medium with a processor of the FIG. 1.

The processor 140 performs operations on data. In some examples, the processor is an application specific processor, for example a processor dedicated to control the printing system 100. The processor 140 may also be a central processing unit.

In some examples, the controller may be used to perform a method according to any of the examples herein disclosed.

The non-transitory machine-readable storage medium 141 may include any electronic, magnetic, optical, or other physical storage device that stores executable instructions. The non-transitory machine-readable storage medium 141 may be, for example, Random Access Memory (RAM), an Electrically Erasable Programmable Read-Only Memory (EEPROM), a storage drive, an optical disk, and the like.

In examples, the printing system 100 may comprise a print head 150 having an opening 151 in communication with the sensor 130. In some examples, the opening 151 may be in fluid communication with the sensor 130. FIG. 3 schematically represents a perspective view of a print head of a printing system according to an example of the present disclosure. In FIG. 3 non-visible elements have been represented with dashed lines.

The opening 151 may be an inlet or mouth to receive flowing air. In some examples, a portion of the mass of air may be received by the opening 151 to sense the dynamic pressure by the sensor 130. In some examples, a portion of the mass of air may be received by the opening 151 to sense a resistance or a variation of the resistance of the thermistor exposed, at least partially, to the mass of air. In some examples, a portion of the mass of air may be received by the opening 151 to sense a flow rate of the mass of air. In examples, the opening 151 may be static, i.e. the opening is not displaced relative to the print head 150.

FIG. 4 schematically illustrates a cross section view of the print head of FIG. 3. The flowing air may travel through a duct or channel 157 until the flowing air may reach the sensor 130 indicative of an air flow, e.g. a pressure sensor to sense the dynamic pressure of air flow, a thermistor to sense a resistance of the thermistor, or a flow rate sensor to sense a flow rate of the air flow. As the sensor 130 may be located away from the opening, flexibility to choose the location of the sensor 130 in the printing system may be achieved.

In some examples, the sensor 130 may be located at the opening 151.

The cross section of the opening 151 may adopt any suitable shape as circle, rounded, squared, polygonal, etc.

In some examples, the print head 150 may have a nozzle plate 152 and an opening face 156 to arrange the opening 151, the opening face 156 may be inclined with respect to the nozzle plate 152. An inclination angle may be defined between the opening face 156 and the nozzle plate 152. A nozzle plate 152 and an opening face 156 can be seen in FIG. 5. FIG. 5 schematically represents a perspective view of print head of a printing system according to an example of the present disclosure.

In some examples, a dynamic pressure of air flowing inclined with respect the nozzle plate may be measured when the opening face 156 may be inclined with respect to the nozzle plate 152. In examples, the resistance of a thermistor indicative of an air flowing inclined with respect the nozzle plate 152 may be measured. In examples, a flow rate of an air flowing inclined with respect the nozzle plate 152 may be measured. In the present disclosure, the cross-sectional area may be generally planar as a kind of surface.

In some examples, the print head 150 may have a nozzle plate 152 and an opening face 156 to arrange the opening 151, the opening face 156 may be substantially perpendicular to the nozzle plate 152.

In examples, a dynamic pressure of air flowing substantially perpendicular to the nozzle plate may be measured when the opening face 156 is substantially perpendicular to the nozzle plate 152. In some examples, the resistance of a thermistor indicative of an air flowing substantially perpendicular to the nozzle plate 152 may be measured. In some examples, a flow rate of an air flowing substantially perpendicular to the nozzle plate 152 may be measured.

In some examples, the nozzle plate 152 may be a dropped nozzle plate with a length of approximately 10 mm.

In some examples, the print head 150 may have a plurality of openings 151 that may be arranged around the nozzle 110. Thus, the property or parameter may be sensed at different points around the nozzle 110. Direction of an air flowing may be accurately monitored with respect to the nozzle 110 and the compensation may be adapted taking into account the direction, e.g. a main vector, of the flowing air. The latter may be accomplished even if the direction of the flowing air is randomly variable. A vector of the air flowing through the print gap 112 may be determined, for instance by the processor 140.

In some examples, the print head 150 may have a plurality of openings 151 that may be perimetrically located with respect to the cross-section of the print gap 112. Thus, the property or parameter may be sensed at different points around the print gap 112. Direction of a flowing air may be accurately monitored with respect to the print gap 112.

In some examples, the print head 150 may have three openings. In examples, the print head 150 may have four openings as per FIG. 3. In examples, the print head 150 may have eight openings as per FIG. 5.

In examples, the number of sensors 130 may be the same as the number of openings 151. However, in some examples, the number of sensors 130 may be different than the number of openings 151

In some examples, the sensor 130, the processor and the nozzle 110 are located in the print head 150. Thus, the compensation for the flowing air may be provided by the print head 150.

In examples, the print head 150 may have a distance sensor 153 to sense the distance or height 180 between the print head and the printing substrate 120. Thus, the printing system 100 may adapt the compensation taking into account the distance or height between the print head and the printing substrate 120. The sensing or measurement may be performed during a printing pass, or during a pass in which no print fluid is deposited on the printing substrate 120. In examples, the processor 140 may receive data from the distance sensor 153.

In some examples, the print head 150 may have a gauge or the like sized at a predetermined length. The gauge may be chosen based on the height of the print gap.

In some examples, the openings 151 may be equally spaced from each other. This way, the direction of the flowing air may be easily determined.

In examples, the print head 150 may comprise a housing 154. The housing 154 may be a support for the parts or components such as the opening/s 151, the nozzle/s, the nozzle plate 152 or the distance sensor 153. In some examples, the processor 140 may be positioned in the print head 150. In some examples, the processor 140 may be positioned out of the print head 150.

In some examples, the housing 154 may have a nozzle face 155 where the nozzle/s 110 is/are arranged and the opening face 156 where the opening/s is/are arranged. The cross-sectional area of the opening 151 may be coplanar with the opening face 156.

In examples, the nozzle face 155 and the opening face 156 may be substantially inclined with respect to each other. In examples, the nozzle face 155 and the opening face 156 may be substantially perpendicular to each other. A nozzle face 155 and an opening face 156 substantially inclined or perpendicular to each other may allow to sense a parameter or property of a mass of air such as a cross wind that may flow, at least partially, through the print gap 112.

In examples, the print head 150 may be generally polygonal-shaped when seen from above. Each of the sides of the polygon may include an opening 151. The latter can be seen in FIG. 5, for instance.

In some examples, the housing 154 may have a central axis CA. The central axis CA may pass through the center of mass of the housing 154. The central axis CA may be substantially perpendicular to the nozzle face 155.

In examples, the print head 150 may comprise a print agent chamber containing print agent 111 to be delivered onto the printing substrate 120.

In some examples, the printing system 100 may be used indoor. In some examples, the printing system 100 may be used outdoor.

The printing system 100 may be scaled to any nozzle resolution and size.

In examples, the printing system 100 may comprise a reference sensor 131 to sense a reference parameter or property with respect to the sensor 130. The reference sensor 131 may be arranged or located in such a way that the reference sensor 131 may be substantially isolated from the influence of the flowing air. The reference sensor 131 may be not influenced, exposed or subjected to the flowing air. FIG. 9 schematically represents a printing system and a reference sensor according to an example of the present disclosure.

The reference sensor 131 may be, for instance, a pressure sensor, a thermistor or a flow rate sensor. In some examples, the printing system 100 may comprise one of the types of reference sensor or several types of reference sensors.

In the example of the thermistor as the sensor 130, the reference sensor 131 may be a thermistor as well. Flowing air may act on or contact the thermistor as the sensor 130. The flowing air may not act on or contact the thermistor as reference sensor 131. The thermistor as reference sensor 131 may sense or measure an ambient temperature, for instance. The resistance of the thermistor as the sensor 130 may be the same or different from the resistance of the thermistor as the reference sensor 131. A comparison between both resistances may be indicative of a velocity of air flowing in the print gap 112. If no difference in resistance is detected or determined the speed of the air flow acting on or contacting the sensor 130 may be substantially negligible. In the example of the NTC thermistor, if the resistance of the sensor 130 is higher than the resistance of the reference sensor 131 thus an air flow may act on or contact the sensor 130 and a speed of the air may be determined, e.g. by the processor or controller 140. In examples, the processor 140 may receive data or reading from the reference sensor 131.

In the example wherein the sensor 130 and the reference sensor 131 are thermistors, any difference in resistance between the sensor 130 and the reference sensor 131 may be caused by a difference in temperature of the sensor 130 and the reference sensor 131. As both the sensor 130 and the reference sensor 131 may be exposed to substantially the same ambient temperature, a difference in temperature may mean that the sensor 130 has dissipated energy in the form of heat into an air flow by convection or that the sensor 130 has absorbed energy in the form of heat from the air flow. Therefore, the difference in resistance between the sensor 130 and the reference sensor 131 may be caused by the presence of an air flow acting on the sensor 130. An amount or value of a difference in resistance between the sensor 130 and the reference sensor 131 may be related to a speed or velocity of the air flow. For instance, an increase of speed of the air flow may mean a higher convection, and conversely, a decrease of speed of the air flow may mean a lower convection. A higher convection may mean a lower temperature of the sensor 130. A lower convection may mean a higher temperature of the sensor 130.

In the examples of the printing system 100 where no reference sensor 131 is present, some values of properties or parameters related to particular conditions of air flowing through the print gap 112 may be predefined if a comparison between a reading of the sensor 130 and a reference value is performed.

In some examples, the print head 150 may be static. The print head or a plurality of print heads may extend along a width of a printing substrate, i.e. in a printing substrate width direction. A print head may be mounted in a print bar spanning a width of the printing substrate. A plurality of nozzles may be distributed within the print head or a plurality of print heads along the width of the printing substrate. The width of the printing substrate extends in a printing substrate width direction. The printing substrate width direction may be substantially perpendicular to the printing substrate advance direction. Such an arrangement may allow most of the width of the printing substrate to be printed simultaneously. These printing systems may be called as page-wide array (PWA) printing systems.

In some examples, the print head may travel repeatedly across a scan axis for delivering print agent onto a printing substrate which may advance along a printing substrate advance direction. The scan axis may be substantially perpendicular to the printing substrate advance direction. The scan axis may be substantially parallel to printing substrate width direction. The print head may be mounted on a carriage for moving across the scan axis. In some examples, several print heads may be mounted on a carriage. In some examples, four print heads may be mounted on a single carriage. In some examples, eight print heads may be mounted on a single carriage.

FIG. 8 schematically represents a vehicle according to an example of the present disclosure. The vehicle 200 comprises: a printing system 100 that has: nozzles 110 to fire a print agent on a printing substrate 120, a sensor 130 to measure a parameter associated with air flowing between the nozzles 110 and the printing substrate 120, a controller 140 to control the operation of the nozzles 110 based on the measured parameter.

In some examples, the controller 140 of the vehicle may be to adjust a firing of the nozzle or nozzles 110 based on the sensed or measured parameter or property. In some examples, the controller 140 of the vehicle may be to adjust an ejection of print fluid or print agent from the nozzle or nozzles 110 of the print head 150 based on the measured or sensed parameter or property.

In examples, the vehicle 200 may be an unmanned vehicle, e.g. a drone. In some examples, the vehicle may be an autonomous or self-driving printer. In examples, the vehicle may be a remotely controlled printer.

In some examples, the vehicle may be aerial or terrestrial. The term "aerial vehicle" refers to a vehicle able to achieve aerodynamic lift. The term "terrestrial vehicle" refers to a self-propelled wheeled vehicle.

The aerial vehicle may comprise a rotor to provide lift, a fixed wing, and a flapping wing. A driving unit may drive the rotor.

The terrestrial vehicle may comprise wheels, e.g. castor wheels 202 and main wheels 201 as shown in FIG. 8. A driving unit may drive the wheels.

In some examples, the vehicle 200 may be to be used indoor or outdoor.

The frame 203 of the vehicle may be raised relative to the ground or printing substrate and so the printing system 100. Thus, a clearance or height of a printing gap 112 may be produced. In examples, the clearance or height of the print gap in a vehicle may be substantially 20 mm to avoid hitting the nozzle 110 and so the print head 150 with stones or other obstacles. In some examples, the clearance of the print gap in the vehicle may be lower than 20 mm. In examples, the clearance of the print gap in the vehicle may be greater than 20 mm.

The FIG. 10 is a block diagram of an example of a method of the present disclosure. The method 300 comprises: measuring a property associated with air flowing through a print gap 112 between a print head 150 and a printing substrate 120, the print head 150 to eject a print fluid 111 on the printing substrate 120 at block 310, and adjusting an ejection of print fluid 111 from the print head 150 based on the measured property at block 320.

The ejection of print fluid 111 may be performed taking into account a magnitude, e.g. amount or quantity, of a measured property, e.g. a dynamic pressure of air flow, an electrical resistance of a thermistor or a flow rate of air flow. The ejection of print fluid 111 may be defined so as to compensate the variations on the property associated with the air flowing through the print gap. Accuracy and repeatability of the print job, and thus the overall quality, may be enhanced. The accuracy and repeatability of the print job may be consistent under the influence of air flowing at different conditions. The accuracy and repeatability of the print job may be achieved in a constantly-changing environment.

An ejected amount of print agent 111 may reach a predefined target in the printing substrate 120 in spite of the air flowing through the print gap 112. Thus, relatively high-resolution dots of print agent may be rendered over any printing substrates 120. Accuracy may be enhanced at any ambient conditions and so productivity may be increased. As the method 300 may compensate for the flowing air, an aerodynamically-compensated drop control may be obtained.

Upon the method 300 of FIG. 10 aerodynamic-induced errors on drop landing may be minimized.

In examples, adjusting an ejection of print fluid 111 may mean adjusting a firing of the nozzle of the print head 150 based on the sensed or measured property. In some examples, adjusting an ejection of print fluid 111 may mean controlling the operation of the nozzles 111 of the printhead 150 based on the measured or sensed property or parameter.

In some examples, the method 300 may comprise measuring the property at a plurality of locations perimetrically arranged with respect to the cross section of the print gap 112. Thus, a direction of a current of air flowing at least partially through the print gap may be determined. This way, the ejection of print fluid 111 from the print head 150 may be adjusted to compensate for the direction of the current of air. A vector of the air flowing through the print gap 112 may be determined, for instance by the processor 140.

In some examples, the print head 150 may comprise a plurality of nozzles 110 and adjusting the ejection may comprise selecting a nozzle 110 to be fired. The plurality of nozzles 110 may be disposed as a set of nozzles, e.g. forming an array or matrix with rows and columns. Each of the nozzles may have a position in the array or matrix that may be expressed by coordinates x, y, i.e. rows and columns of nozzles 110.

In some examples, selecting the nozzle 110 may comprise firing a further nozzle instead of a predefined nozzle. A predefined nozzle may be selected in order to eject print fluid 111 onto a target location in the printing substrate 120. So, the further nozzle may have different coordinates x, y than the predefined nozzle. Thus, an offset of coordinates x, y may be applied to compensate for the drop error as can be seen in FIG. 5. FIG. 6 shows an example of a drop of print fluid 111 ejected from a further nozzle 110. This way, a compensation for the flowing air may be achieved.

In examples, selecting the nozzle 110 may comprise firing a predefined nozzle. The predefined nozzle may not be changed and the coordinates x, y of the nozzle 110 may be unchanged. The selected nozzle 110 may be the same as the predefined nozzle 110.

In some examples, adjusting the ejection may comprise setting a timing of firing of a nozzle 110 of the print head 150. The firing of the nozzle may be advanced or delayed with respect to a pre-set or standard time.

In some examples, setting the timing of firing may comprise advancing or delaying the firing of the nozzle 110. Based on the measured or sensed property, the firing of a nozzle may be advanced or delayed so as to not interfere with the firing of a further nozzle. For instance, by varying a nozzle to be fired a delay in providing the print fluid 111 may be produced. Thus, a further nozzle to be fired next may be activated with a certain delay so as not interfere with the firing of the previous nozzle. Conversely, a nozzle to be fired instead of another one, may be activated with a certain advance in order to avoid an interference with the nozzle to be fired next.

In some examples, setting the timing of firing may comprise maintaining the time of firing of the nozzle 110. Based on the measured or sensed property, the firing of a nozzle may be maintained, i.e. unchanged.

In some examples, measuring a property may comprise measuring a dynamic pressure of air flowing through the air gap 112 and the measured property may be the measured dynamic pressure.

In some examples, measuring a property may comprise measuring an electrical resistance of a thermistor and the measured property may be the measured electrical resistance of the thermistor.

In some examples, measuring a property may comprise measuring a flow rate of air flowing through the print gap 112 and the measured property may be the measured flow rate.

In some examples, the method 300 may comprise determining a velocity based on the measured property. In the example of dynamic pressure as property, as the dynamic pressure can be formulated as ½ of the density times local velocity ^2, the magnitude or velocity of air flow may be obtained upon the dynamic pressure of the air flow. In the example of resistance of a thermistor, as a variation of resistance of the thermistor may be related to a decrease in temperature of the thermistor, a defined resistance or variation of resistance may be associated with a magnitude or velocity of an air flow. In the example of flow rate, a flow rate of air flow may be related to a speed or velocity of air flow.

In some examples, the method 300 may comprise determining a distance or height between the print head 150 and the printing substrate 120. When the printing substrate is a print medium, the distance is known as the printhead-to-print medium spacing, or pen-to-paper spacing, PPS. When the printing substrate is the ground or floor, the distance is known as the printhead-to-floor spacing. The distance or height between the print head and the printing substrate may be the height of the print gap.

In examples, the method 300 may comprise determining a weight of a print agent drop.

In some examples, the trajectory path of an amount of print agent such as a drop may be predicted before adjusting an ejection of print fluid.

By way of example, a prediction of the trajectory path of a drop of print agent may be carried out based on at least one of the following: print agent drop weight, distance between the print head 150 or nozzle 110 and the printing substrate 120, magnitude or velocity of the current of air and direction of the current of air with respect to the print head 150 or nozzle 110. If the drop of print agent is delivered at certain height from the target, the ejection of print fluid 111 from the print head 150 may be adjusted to compensate for the flowing air that could interfere with the trajectory path of the drop.

In some examples, the ejection of print fluid 111 may be adjusted without performing any prediction of the trajectory path of a drop of print agent.

In this method, the printing system may be according to any of the examples herein disclosed.

The non-transitory machine-readable storage medium 141 may be encoded with instructions which, when executed by the processor 140, cause the processor 140 to measure a property associated with air flowing through a print gap 112 between a print head 150 and a printing substrate 120, the print head 150 to eject a print fluid 111 on the printing substrate, and adjust an ejection of print fluid 111 from the print head 150 based on the measured property.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A method comprising:

measuring, in real time, via a sensor, airflow of air that originates external to the print head, said air flowing through a print gap between a print head and a printing substrate, the print head to eject a print fluid on the printing substrate; and adjusting, substantially at the real time, an ejection of print fluid from the print head based on the measured property.

2. The method of claim 1, comprising: measuring the property airflow at a plurality of locations perimetrically arranged with respect to the cross section of the print gap.

3. The method of claim 1, wherein the print head comprises a plurality of nozzles and adjusting the ejection comprises selecting a nozzle to be fired.

4. The method of claim 3, wherein selecting the nozzle comprises firing a further nozzle instead of a predefined nozzle.

5. The method of claim 1, wherein adjusting the ejection comprises setting a timing of firing of a nozzle of the print head.

6. The method of claim 5, wherein setting the timing of firing comprises advancing or delaying the firing of the nozzle.

7. The method of claim 1, wherein: measuring, via the sensor, airflow—comprises measuring a dynamic pressure of air flowing through the print gap; and the measured property is the measured dynamic pressure.

8. A printing system comprising:

a nozzle to eject a drop of print agent through a print gap between the nozzle and a printing substrate;

a sensor to measure, in real time, an air flow in the print gap, the air flow originating external to the nozzle; and a processor to adjust, substantially at the real time, a firing of the nozzle based on a reading of the sensor.

9. The printing system of claim 8, comprising: a print head having an opening in communication with the sensor.

10. The printing system of claim 9, wherein: the print head having a nozzle plate and an opening face to arrange the opening, the opening face being inclined with respect to the nozzle plate.

11. The printing system of claim 9, wherein: the print head having a nozzle plate and an opening face to arrange the opening, the opening face being substantially perpendicular to the nozzle plate.

12. The printing system of claim 9, wherein: the print head having a plurality of openings being arranged around the nozzle.

13. The printing system of claim 9, wherein: the print head having a plurality of openings being perimetrically located with respect to the cross-section of the print gap.

14. The printing system of claim 8, wherein: the sensor is a pressure sensor to sense a dynamic pressure associated with air flowing in the print gap, and the processor is to adjust a firing of the nozzle based on the sensed dynamic pressure.

15. A vehicle comprising: a printing system having:

nozzles to fire a print agent on a printing substrate;

a sensor to measure, in real time, airflow between the nozzles and the printing substrate, the air originating external to the nozzles; and a controller to control, substantially at the real time, the operation of the nozzles based on the measured airflow.

* * * * *